United States Patent [19]
Foster

[11] 3,821,410
[45] June 28, 1974

[54] FUNGICIDAL USE OF CERTAIN THIOBENZENOID COMPOUNDS

[75] Inventor: Harold Marvin Foster, Park Forest, Ill.

[73] Assignee: The Sherwin-Williams Company, Cleveland, Ohio

[22] Filed: Mar. 22, 1971

[21] Appl. No.: 126,980

Related U.S. Application Data

[62] Division of Ser. No. 865,981, Oct. 13, 1969, Pat. No. 3,621,065.

[52] U.S. Cl. .............................................. 424/337
[51] Int. Cl. ............................................. A01n 9/12
[58] Field of Search ...... 424/337; 260/609 D, 609 F

[56] References Cited
UNITED STATES PATENTS
3,541,157   11/1970   Hay et al. .................... 260/609 F X
3,621,065   11/1971   Foster ........................... 260/609 D Primary Examiner—Albert T. Meyers
Assistant Examiner—Leonard Schenkman
Attorney, Agent, or Firm—James V. Tura; Richard G. Smith

[57] ABSTRACT

A class of compounds having the structure:

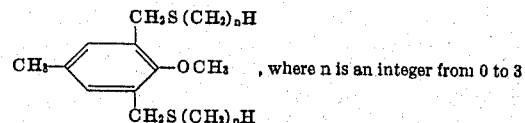

, where n is an integer from 0 to 3 are useful as microbiocides.

4 Claims, No Drawings

FUNGICIDAL USE OF CERTAIN THIOBENZENOID COMPOUNDS

This is a division of application Ser. No. 865,981 Oct. 13, 1960 U.S. Pat. No. 3,621,065.

DESCRIPTION

This invention relates to thiobenzenoid compounds and the uses thereof which are $\alpha, \alpha'$-dithio derivatives of 2-methoxy-5-methyl-m-xylene. In particular, mercapto and thioether compounds having activity against microorganisms, especially fungi, are provided.

The thiobenzenoid compounds of this invention can be synthesized from 2,6-bis(hydroxymethyl)-4-methylanisole, which is described by Ullmann and Brittner in Ber., 42, 2539(1909). This starting material is used to make an intermediate compound, 2-methoxy-5-methyl-m-xylylene dichloride by reaction with thionyl chloride. This method is described in detail in my copending U.S. patent Application, Ser. No. 865,945 filed Oct. 13, 1969, now U.S. Pat. No. 3,631,113, and entitled "2-Methoxy-5-methyl-m-xylylene dichloride", incorporated herein by reference.

To prepare the thioether species of this invention, the dichloride precursor is reacted by heating with a lower n-alkyl thiol in the presence of a base, according to the following reaction:

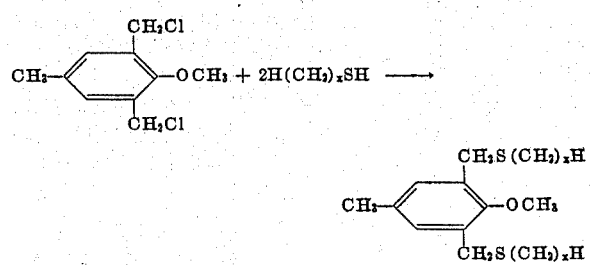

where $x$ is $n$ integer from 1 to 3.

The dithiol species can be prepared by a two step process in which the same precursor, 2-methoxy-5-methyl-m-xylylene dichloride, is reacted by heating with thiourea in alcohol solution to convert the precursor to a second intermediate, 2-methoxy-5-methyl-m-xylylenebis(isothiuronium chloride). This reaction is described in my copending U.S. Patent Application, Ser. No. 865,978, now U.S. Pat. No. 3,634,513, filed concurrently herewith and entitled "2-Methoxy-5-methyl-m-xylylenebis(isothiuronium chloride)", which is incorporated herein by reference.

The conversion of the second intermediate to the dithiol derivative is obtained by heating the isothiuronium chloride compound with a sodium carbonate, according to the following reaction:

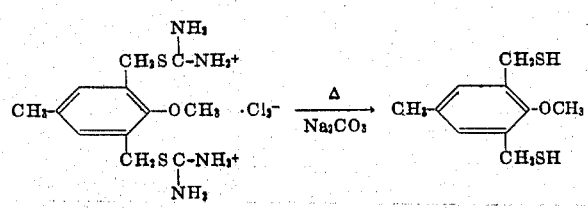

The invention is demonstrated by the following examples in which the units are parts by weight unless otherwise stated. The inventive concept is not limited by these examples.

Example I

To a refluxing solution of 334 parts by weight (4.4 mols) of 1-propanethiol, 176 parts sodium hydroxide (4.4 mols) and 1632 parts ethanol was added a slurry of 438 parts (2 mols) of 2-methoxy-5methyl-m-xylylene dichloride in 1224 parts ethanol. This addition was carried out incrementally over a period of 20–30 minutes with agitation of the reaction mixture. The heating under reflux at about 80° C was continued for about 6 hours, and the mixture was filtered hot to remove inorganic salts. The volative liquid was removed by vacuum distillation at 100 mmHg.. The residue was dissolved in bensone, washed with water and diluted aqueous NaOH solution, and dried over anhydrous calcium sulfate to remove the solvent.

A residual oil was recovered and vacuum distilled to yield five fractions. Table I shows the boiling range of each fraction, the weight of the fraction, estimated minimum purity by vapor phase chromatography methods (GLC) and estimated minimum purity by thin layer chromatography (TLC).

TABLE I

| Fraction No. | Boiling range (°C) | Pressure (mmHg) | GLC assay (wt %) | TLC assay (wt %) | Parts by weight |
|---|---|---|---|---|---|
| 1 | 30.5–26 | 0.4 | discarded | | 09 |
| 2 | 147.0–151 | 0.45 | 83% | >95% | 122 |
| 3 | 151.0–153 | 0.40 | 90 | >95 | 42 |
| 4 | 150.0–153 | 0.38 | 97 | >95 | 176 |
| 5 | 150.0–155 | 0.35 | 87 | >95 | 15 |

The GLC assays in Table I are based on unweighted peak-area calculations and are considered to be lower than the actual value. The total recovered product was 323 parts (54.2 percent yield). The structure was corroborated as 2,6-bis(n-propylthiomethyl)-4-methylanisole by infrared and nuclear magnetic resonance spectra. Microanalysis gave the following atomic fractions:

Calculated for: $C_{16}H_{26}OS_2$: C, 64.38; H, 8.78; S, 21.48
Found: C, 64.55; H, 8.81; S, 21.42.

Example II

A mixture of 372 parts (1 mol) of 2-methoxy-5-methyl-m-xylylenebis(isothiuronium chloride), 210 parts (2 mols) anhydrous sodium carbonate, and 3,000 parts water was heated under reflux for about 1.5 hours, then cooled to ambient temperature. The reaction mixture was extracted with 2,230 parts chloroform three times. The chloroform extract solution was combined and dried by passing through anhydrous calcium sulfate. The chloroform was removed by heating the colution and drying under vacuum. The residual oil was distilled under reduced pressure to give three fractions. Table II shows the boiling range, of each fraction, the weight of the fraction, estimated minimum purity by vapor phase. chromatography methods (GLC), and estimated minimum purity by thin layer chromatography (TLC).

TABLE II

| Fraction No. | Weight parts | Boiling range (°C) | Pressure (mmHg) | TLC assay (wt %) | GLC assay (wt %) |
|---|---|---|---|---|---|
| 1 | 6 | 121.0–125 | 0.3 | — | 97% |
| 2 | 95 | 118.5–123 | 0.23 | 99% | 98% |
| 3 | 60 | 119.0–121 | 0.23 | — | 98% |

The total yield was 158 parts of 2-methoxy-5-methyl-m-xylylene-dithiol (74.5 percent of theory). Infrared and nuclear magnetic resonance studies corroborated the structure, and the following microanalyses were determined:

Calculated for: $C_{10}H_{12}OS_2$: C, 56.04; H, 6.58; S, 29.92
Found: C, 56.31; H, 6.47; S, 29.91.

UTILITY

Agar Plate Tests

A standard laboratory test used to evaluate fungicidal properties of compounds in the agar plate test, performed according to U.S.D.A. Circular No. 198 (1931). A Difco potato dextrose agar plate was selected as the organic nutrient surface. The test compound, 2-methoxy-5-methyl-m-xylylenedithiol, was dissolved in an organic solvent as solute in concentrations of 1 to 0.01 percent by weight, and the solution was applied uniformly over the surface of sterile filter pads (½-inch diameter). After evaporation of the carrier liquid, the pads were placed on the agar plates. Both pads and plates were innoculated with a spore suspension of the test fungi, Pullularia pullulans (P. p.) Cladosporium sphaerospermum (C. s.), and Asporgillus niger (A. n.). The dithiol sample was compared to a commercially used fungicide, captan. After a period of standard incubation, the pads and agar plates were examined to determine growth (+) of fungus on the pad and to measure the zone width (millimeters) of growth inhibition in the agar plate beyond the periphery of the smaller treated pad. The results of the agar plate tests are shown in Table III.

Textile protection

Desized cotton sheeting was treated with 2,6-bis(n-propylmercaptomethyl)-4-methylanisole in an amount sufficient to deposit 1 part of the compound per 100 parts of cotton. The carrier was evaporated and the samples were placed on a dextrose-mineral salts agar plate in a sterile environment. The samples were innoculated with a suspension of mixed fungi spores (AATC 5760.1). The treated samples and negative controls were observed at three and seven day intervals. No growth was noted on the treated samples in this test; however, the untreated control material had fungi growth. This indicates that the compound can be used to increase the longevity of textiles.

Biological activity

A series of tests was conducted to demonstrate the biological activity of 2-methoxy-5-methyl-m-xylylenedithiol against ten species of bacteria, yeasts and fungi. The test procedure was similar to the agar plate tests above. The test compounds were dissolved in an organic solvent at 1% concentration, and a measured amount was applied to a filter paper disc. The dried paper disc was sterilized with ethylene oxide and the disc was placed on the special agar needed with the test organism. A standard incubation period was used for the control, dithiol sample and a comparative commercial microbiocidal compound, hexachlorophene. The results for the tests are shown in Table IV, in which the zone of inhibition is given. The test organisms included: Staphylococcus aureus (S. a.), Aerobacter aerogenes (A.a.), Pseudomonas aeruginosa (P.a.), Torula utilis (T.u.), Saccraromyces cerevisiae (S.c.), Penicillium expansum (P.e.), Chaetomium globosum (C.g.), Rhizopus nigricans (R.n.), Pullularia pullulans (P.p.), and Aspergillus niger (A.n.).

TABLE IV

| Compound | Biocidal Zone of Inhibition (mm) | | | | | | | | | |
|---|---|---|---|---|---|---|---|---|---|---|
| | S.a. | A.a. | P.a. | T.u. | S.c. | P.e. | C.g. | R.n. | P.p. | A.n. |
| Dithiol | 0 | 0 | 0 | 1 | 1 | 6 | 3 | 4 | 5 | 4 |
| Negative control | 0 | 0 | 0 | 0 | 0 | 0 | 0 | 0 | 0 | 0 |
| Hexachlorophene | 6 | 4 | 2 | 1 | 1 | 1 | 1 | 3 | 2 | 2 |

In using the novel compounds of this invention as microbiocides, the application can be by several methods. A biocidally effective amount of the active compound may be applied to the loci of the microorganism by direct contact of the compound in an inert carrier also, the compound may be incorporated directly in a fiber film or coating.

While the invention has been described by specific examples, there is no intent to limit the inventive concept thereby.

TABLE III

FUNGICIDAL ACTIVITY

| Compound wt. % | Conc. (mm.) | Test Organism | | | | | |
|---|---|---|---|---|---|---|---|
| | | P.p. | | C.s. | | A.n. | |
| | | Zone on pad (mm.) | Growth on pad | Zone on pad (mm.) | Growth on pad | Zone on pad (mm.) | Growth on pad |
| Dithiol | 1 | 7 | 0 | 16 | 0 | 7 | 0 |
| | 0.1 | 3 | + | 0 | + | 2 | + |
| | .01 | 0 | + | 0 | + | 0 | + |
| Captan | 0.1 | 10 | 0 | 17 | 0 | 11 | 0 |
| | 0.01 | 5 | 0 | 8 | 0 | 4 | 0 |
| Control | 0 | 0 | + | 0 | + | 0 | + |

I claim:
1. A method for controlling fungi which comprises applying to the loci of the fungi a fungicidally effective amount of at least one compound having the structural formula:

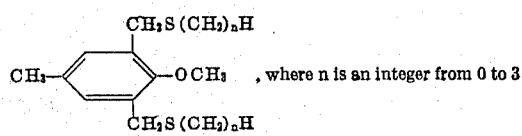, where n is an integer from 0 to 3

2. The method of claim 1 wherein the compound is 2,6-bis (n-propylmercaptomethyl)-4-methylanisole.

3. The method of claim 1 wherein the compound is 2-methoxy-5-methyl-m-xylylenedithiol.

4. The method of claim 1 wherein the fungi are *Pullularia pullulans, Cladosporium sphaerospermum* or *Aspergillus niger*.

* * * * *